No. 872,712.
PATENTED DEC. 3, 1907.
D. H. CHURCH, DEC'D.
H. L. CHURCH, EXECUTRIX.
WATCH.
APPLICATION FILED MAR. 1, 1905.
2 SHEETS—SHEET 1.
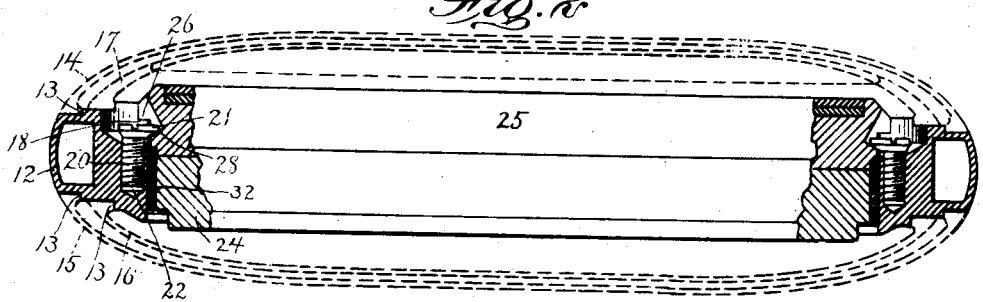
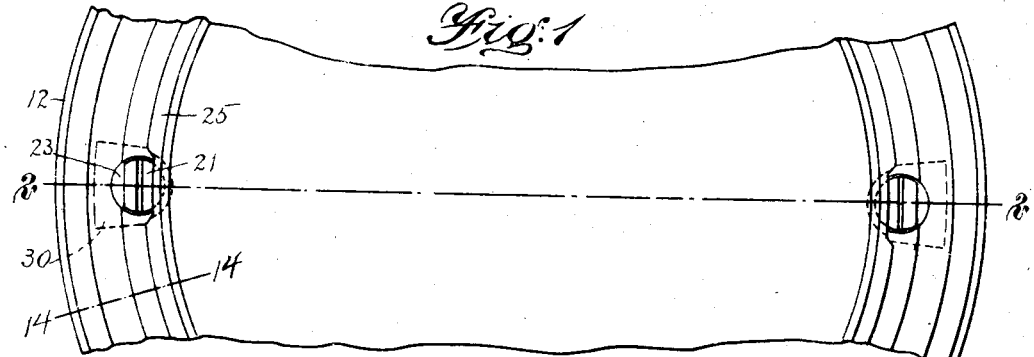
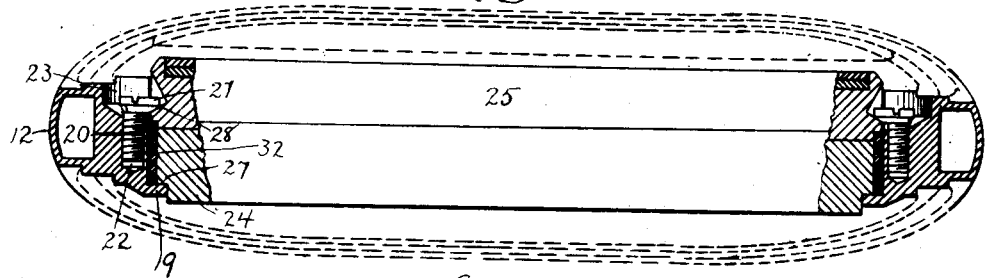
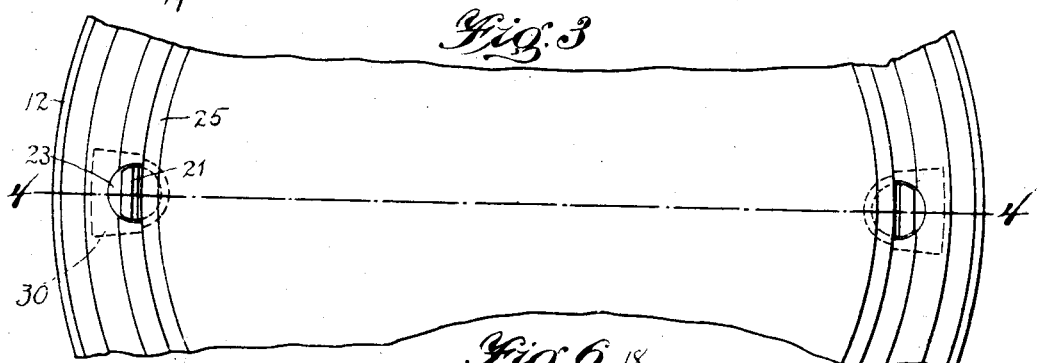
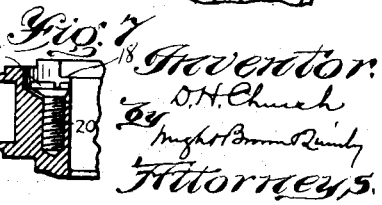

No. 872,712.
D. H. CHURCH, DEC'D.
H. L. CHURCH, EXECUTRIX.
WATCH.
APPLICATION FILED MAR. 1, 1905.
PATENTED DEC. 3, 1907.
2 SHEETS—SHEET 2.
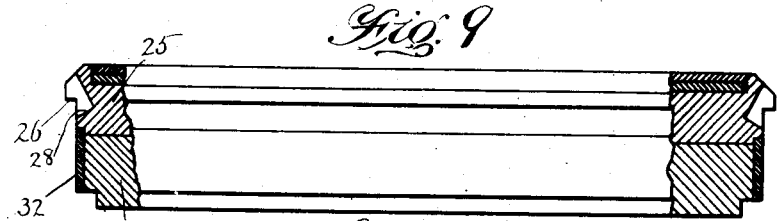
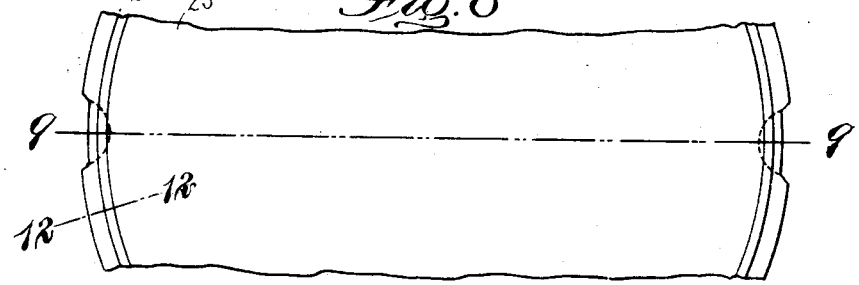
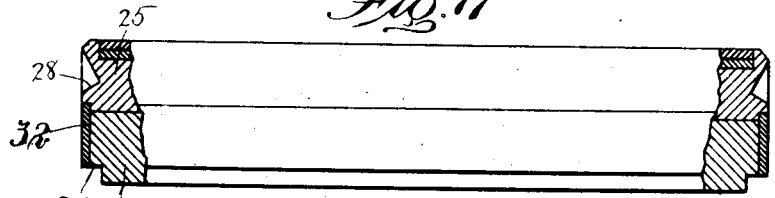
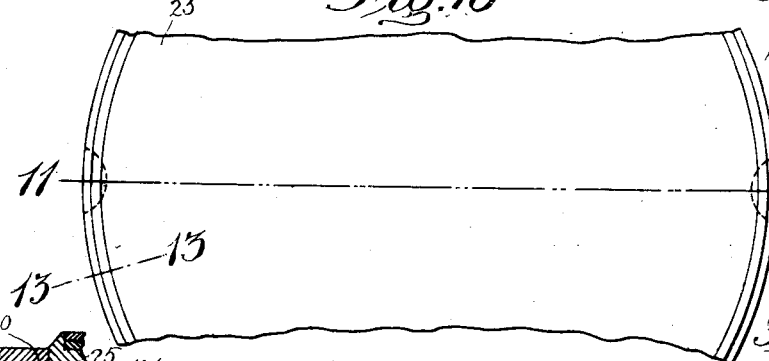
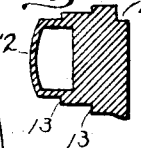
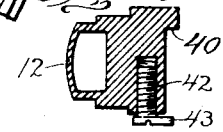
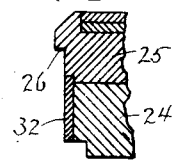
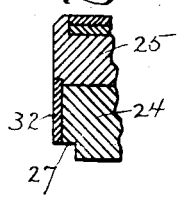
Witnesses.
M. Mattison
E. Batchelder
Inventor.
D. H. Church
by Wright Brown & Quinby
Attorneys.

UNITED STATES PATENT OFFICE.

DUANE H. CHURCH, OF NEWTON, MASSACHUSETTS; HARRIET L. CHURCH, EXECUTRIX OF SAID DUANE H. CHURCH, DECEASED, ASSIGNOR, BY MESNE ASSIGNMENTS, TO WALTHAM WATCH COMPANY, A CORPORATION OF MASSACHUSETTS.

WATCH.

No. 872,712.     Specification of Letters Patent.     Patented Dec. 3, 1907.

Application filed March 1, 1905. Serial No. 247,840.

*To all whom it may concern:*

Be it known that I, DUANE H. CHURCH, of Newton, in the county of Middlesex and State of Massachusetts, have invented certain new and useful Improvements in Watches, of which the following is a specification.

This invention has for its object to provide an improved construction of the case-center and movement of a watch, whereby the engagement of the movement with the case-center will be simplified and made more secure and efficient.

The invention consists in the improvements which I will now proceed to describe and claim.

Of the accompanying drawings, forming a part of this specification,—Figure 1 represents a plan view, showing a portion of a case-center and a movement engaged therewith. Fig. 2 represents a section on line 2—2 of Fig. 1. Fig. 3 represents a view similar to Fig. 1, showing a slightly different embodiment of the invention. Fig. 4 represents a section on line 4—4 of Fig. 3. Figs. 5, 6, and 7 are fragmentary sectional views hereinafter referred to. Fig. 8 represents a plan view of a portion of the top-plate side of a watch movement embodying my invention. Fig. 9 represents a section on line 9—9 of Fig. 8. Fig. 10 represents a view similar to Fig. 8, showing a modification. Fig. 11 represents a section on line 11—11, Fig. 10. Fig. 12 represents a section on line 12—12, Fig. 8. Fig. 13 represents a section on line 13—13, Fig. 10. Fig. 14 represents a section on line 14—14, Fig. 1. Figs. 15 and 16 represent another modification.

The same reference characters indicate the same parts in all the figures.

In the drawings,—12 represents a case-center, which is or may be provided at its sides with the usual annular shoulders 13, for engagement with the outer and inner covers and the bezel. I have here shown the center provided with shoulders, to engage the front cover 14, the back cover 15, the inner cover 16, and the bezel 17 of a hunting-case watch; but it will be obvious that so far as these parts are concerned, the case-center may be of any other suitable construction, and adapted for an open-face watch as well as for a hunting case. The case-center is provided with an internal seat adapted to engage a corresponding face on the watch-movement, and to limit the insertion of the movement into the case-center in one direction.

In the embodiment of the invention shown in Figs. 1, 2, and 5, a movement-supporting seat 18 is formed upon the interior of the case-center near the face or front side thereof, viz., the side which engages the bezel. In the construction shown in Figs. 3 and 4, a movement-supporting seat 19 is located near the back side of the case-center. In either case, the movement-containing space of the case-center is enlarged at the front or dial side, to permit the insertion of the movement from that side only, and is reduced to form a movement-supporting seat facing the front side. The said seat limits the insertion of the movement into the case-center, and prevents displacement of the movement toward the back of the case-center.

In the construction shown in Figs. 15 and 16, the movement-containing space is enlarged at the back side of the case-center, to permit the insertion of the movement from that side, and is reduced to form a movement-supporting seat 40 facing the back side and preventing displacement of the movement toward the front side, the movement being inserted from the back side only.

The watch movement includes a top-plate 24, and a pillar-plate 25, said parts being formed to support the time mechanism (not shown) of the watch movement. The movement is provided with a face adapted to bear upon the seat or shoulder 18, 19, or 40 of the case-center. In the construction shown in Figs. 1 and 2, the pillar-plate is provided with a face 26 adapted to bear on the seat 18. In the construction shown in Figs. 3 and 4, the top-plate is provided with a face 27 adapted to bear on the seat or shoulder 19. In the construction shown in Fig. 15, the pillar-plate is provided with a face 41 adapted to bear on the seat 40.

One of the parts denominated the case-center and movement is provided with an adjustable movement-securing device adapted to hold the movement in engagement with the movement-supporting seat 18, 19, or 40, and to coöperate with the said seat or shoulder in confining the watch movement against displacement in either direction. In the embodiment of my invention shown in Figs. 1 to 7, the securing device is a screw 20, the threaded shank of which is engaged with a tapped socket 22 formed in the case-center, the said screw having an eccentric head 21 adapted when the screw is turned to one position, to project into the interior of the case-center, as shown in Figs. 1, 2, 3, 4, and 6, and thus engage the watch movement, the said head being adapted to be retracted from the interior of the case-center, as shown in Fig. 7, by a half-rotation of the screw, thus leaving the movement free to be withdrawn.

The portion of the case-center which surrounds and forms the wall of the screw-socket 22 may be composed of a metal which is harder than the metal of the main portion of the case-center. In Figs. 1 and 3, I have shown by dotted lines a hard metal block 30, which may be brazed to the walls of a cavity formed for its reception or otherwise incorporated into the case-center, the screw-socket 22 being formed in said block. The case-center is provided with a cavity 23, communicating with the tapped socket 22 and communicating with the interior of the case center, said socket accommodating the screw-head 21 and receiving the entire head when the screw is turned to the position shown in Fig. 7. In the embodiment shown in Fig. 16, the securing device is shown as a screw 42 engaged with a tapped socket in the rear side of the case-center and having an eccentric head 43 adapted to engage a face 44 formed on the top-plate.

The watch movement shown in Figs. 1, 2, 3, 4, 8, 9, 10, and 11 is provided in its perimeter with a cavity adapted to engage the movement-securing device 21, the face 28 of said cavity being opposed to the under side of the screw-head, which forms an adjustable seat engaging said face 28 and preventing displacement of the movement toward the front or dial side of the case-center. The cavity-face 28 and the inner side of the screw-head are preferably beveled, as shown in Figs. 2 and 4. The cavity in the watch movement is preferably formed in the pillar-plate, as shown in Figs. 2 and 4.

32 represents a ring or band which surrounds the top-plate.

I claim:

1. A watch-case center having a space in which is an internal seat or shoulder adapted to prevent displacement of a movement in one direction from its operative position, and an adjustable securing device adapted to be projected inwardly from a point over the case center into the space to engage the movement and prevent its displacement in the opposite direction.

2. A watch case center formed with a space and a movement supporting seat to receive and support a movement and provided with a cavity between its sides communicating with its interior, and an adjustable movement-securing device carried by the center in said cavity, and adapted to be projected into the interior of the case-center.

3. A watch case center formed with a space and a movement supporting seat to receive and support a movement and provided with a tapped socket, a cavity at the outer end of the socket, said cavity communicating with the interior of the case center, and a screw engaged with said socket and provided with an eccentric head located in said cavity and adapted to be projected therefrom into the interior of the case center.

4. A watch comprising a movement provided in its periphery with a cavity having a screw head seat, and a case center formed with a space and a movement supporting seat to receive and support the movement, and provided with an adjustable screw having an eccentric head adapted to be projected into the movement-cavity and engage the said seat.

5. A watch comprising a top plate and a pillar plate, the latter having a cavity in its periphery, combined with a case center formed to receive and support said movement, and provided with an adjustable securing device adapted to be projected inwardly to engage said cavity.

6. A watch movement having a face adapted to engage a seat on a case center, and a cavity one side of which presents a face adapted to engage a securing device on the case center.

7. A watch comprising a case center having a movement containing space which is enlarged at the front or dial side to permit the insertion and removal of the movement, and is reduced to form a movement supporting seat between its front and rear sides, and a watch movement the pillar plate of which has a face opposed to said seat, the case center and pillar plate having complemental confining members adapted to hold the pillar plate face against the seat.

8. A watch comprising a case center having a movement containing space which is enlarged at the front or dial side to permit the insertion and removal of the movement, and is reduced to form a movement supporting seat between its front and rear sides, and a watch movement the pillar plate of which has a face opposed to said seat, one of said parts having a recess constituting a locking member, while the other part has an adjustable locking member adapted to be projected into said recess.

9. A watch comprising a case center having a movement containing space which is enlarged at the front or dial side to permit the insertion and removal of the movement, and is reduced to form a movement-supporting fixed seat between its front and rear sides, the case center having also an adjustable seat facing in the opposite direction from the said fixed seat and adapted to be projected into the movement containing space, and a watch movement the pillar plate of which has a face adapted to engage said fixed seat, and another face adapted to engage said adjustable seat.

In testimony whereof I have affixed my signature, in presence of two witnesses.

DUANE H. CHURCH.

Witnesses:
C. F. BROWN,
E. BATCHELDER.